United States Patent
Rump et al.

(10) Patent No.: US 7,117,365 B1
(45) Date of Patent: Oct. 3, 2006

(54) METHOD AND DEVICE FOR GENERATING A DATA STREAM AND METHOD AND DEVICE FOR PLAYING BACK A DATA STREAM

(75) Inventors: Niels Rump, Kent (DE); Juergen Koller, Erlangen (DE); Karlheinz Brandenburg, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 09/913,690

(22) PCT Filed: Dec. 15, 1999

(86) PCT No.: PCT/EP99/09980

§ 371 (c)(1),
(2), (4) Date: Aug. 23, 2002

(87) PCT Pub. No.: WO00/49754

PCT Pub. Date: Aug. 24, 2000

(30) Foreign Application Priority Data

Feb. 16, 1999 (DE) ................................. 199 06 432

(51) Int. Cl.
*H04L 9/00* (2006.01)
*H04N 7/167* (2006.01)

(52) U.S. Cl. ........................ 713/176; 713/168; 380/201; 380/202

(58) Field of Classification Search .................. 713/176; 380/201, 202
See application file for complete search history.

(56) References Cited

U.S. PATENT DOCUMENTS

| 5,303,303 | A |  | 4/1994 | White |  |
| 5,315,448 | A | * | 5/1994 | Ryan | .......................... 360/60 |
| 5,390,297 | A | * | 2/1995 | Barber et al. | .................. 726/29 |

(Continued)

FOREIGN PATENT DOCUMENTS

EP 0 717 564 A2 6/1996

(Continued)

OTHER PUBLICATIONS

Bruce Schneier, "Applied Cryptography: Protocols, Algorithms, and Source Code in C," 2nd ed., John Wiley & Sons, Inc. (1996).

(Continued)

*Primary Examiner*—Emmanuel L. Moise
*Assistant Examiner*—Jaric Loving
(74) *Attorney, Agent, or Firm*—Michael A. Glenn; Glenn Patent Group (57) ABSTRACT

In a method for generating a second data stream from a first data stream, which comprises a first header and a first payload data block with payload data, the first header is initially extracted from the first data stream. Subsequently the second header for the second data stream is generated. Then, at least a part of the first header is entered into the second header, the part of the first header including information, which allows conclusions as to the origin of the payload data. Finally, the second payload data block is generated, which comprises the same payload data, so as to obtain the complete second data stream. The method according to the invention enables device-specific encrypting of payload data, a flexible, device-specific "copy" for other devices of a user and, in particular, complete documentation of the origin of the present copy, such that effective copyright protection may be realized.

19 Claims, 5 Drawing Sheets

U.S. PATENT DOCUMENTS

| | | | |
|---|---|---|---|
| 5,420,866 A * | 5/1995 | Wasilewski | 370/426 |
| 5,559,814 A | 9/1996 | Rolin et al. | |
| 5,590,202 A * | 12/1996 | Bestler et al. | 380/212 |
| 5,689,566 A | 11/1997 | Nguyen | |
| 5,712,914 A | 1/1998 | Aucsmith et al. | |
| 5,761,302 A * | 6/1998 | Park | 380/201 |
| 5,765,152 A * | 6/1998 | Erickson | 707/9 |
| 5,854,840 A * | 12/1998 | Cannella, Jr. | 380/268 |
| 6,205,140 B1 * | 3/2001 | Putzolu et al. | 370/389 |
| 6,226,680 B1 * | 5/2001 | Boucher et al. | 709/230 |
| 6,438,145 B1 * | 8/2002 | Movshovich et al. | 370/536 |
| 6,463,151 B1 * | 10/2002 | Iitsuka et al. | 380/201 |
| 6,496,927 B1 * | 12/2002 | McGrane et al. | 713/1 |
| 6,735,311 B1 * | 5/2004 | Rump et al. | 380/231 |

| | | | |
|---|---|---|---|
| 2001/0053979 A1 | | 12/2001 | Kori |

FOREIGN PATENT DOCUMENTS

| | | |
|---|---|---|
| EP | 0 755 056 A2 | 1/1997 |
| EP | 0833241 A2 | 4/1998 |
| EP | 0 860 823 A1 | 8/1998 |
| EP | 0 874 503 A2 | 10/1998 |
| JP | 10-107787 | 4/1998 |
| JP | 10-108148 | 4/1998 |
| WO | WO98/24206 | 6/1998 |

OTHER PUBLICATIONS

Menezes, et al. Handbook of Applied Cryptography. CRC Press. 1997.

* cited by examiner

METHOD AND DEVICE FOR GENERATING A DATA STREAM AND METHOD AND DEVICE FOR PLAYING BACK A DATA STREAM

FIELD OF THE INVENTION

The present invention relates to the encryption or decryption of payload data, like e.g. audio and/or video data and especially to audio and/or video data present in the form of a data stream comprising a header and a payload data block.

BACKGROUND OF THE INVENTION AND PRIOR ART

With the occurrence of telecommunication networks and in particular due to the huge spreading of multimedia data-capable personal computers and, most recently, of so-called solid state players, a need has arisen to market digital multimedia data, such as digital audio data and/or digital video data, commercially. Telecommunication networks for example can be analog telephone lines, digital telephone lines, such as ISDN, or the Internet. Among the commercial providers of multimedia products there is a need to sell or lend multimedia data, wherein it should be possible for a costumer to be able to select a certain product individually at any time from a certain catalogue, this product then of course being only allowed to be used by the costumer who has paid for it.

Unlike well-known encrypted television programs, such as the television channel Premiere, in which the emitted data is encrypted in the same way for all users who have acquired a suitable decryption device by paying a certain charge, the present invention is to provide methods and devices enabling an individual, customer-selective and safe encryption and decryption of multimedia data. Unlike the television channels mentioned above which give a fixed program all of which the user has to decide for, the methods and devices of the present invention enable a maximum freedom of selection for the user, which means that the user has only to pay for those products he or she actually wants to use.

DE 196 25 635 C1 describes methods and devices for encrypting and decrypting multimedia data, the multimedia data being present in the form of an encrypted multimedia file comprising a destination data block and a payload data block. Parts of the destination data block and at least some parts of the payload data block are encrypted by means of different keys, especially symmetrical encryption methods being used.

Further, in the method for encrypting or decrypting multimedia data described in DE 196 256 35 C1 a user index is entered into a determination data block of a bitstream with encrypted multimedia data that identifies the user authorized to use an encrypted multimedia data stream. If this user index identifies merely one person, this method is only safe against unauthorized copying if that person who has purchased an encrypted multimedia data stream acts correctly and legally. This can, however, not always be guaranteed. If the person who has purchased an encrypted multimedia data stream legally carries out copying, it will not be possible to see from a copy who has copied it. The origin of the copy can therefore not be tracked down anymore which will open the way for violations of copyrights, incorrect behaviour assumed.

However, if the user index does, not only identify the user as a person but a specific player of a user, like e.g. the PC of the user, a safety is achieved in such a way that the user can play the encrypted multimedia data stream only on the player identified by the user index regardless whether the user behaves legally or illegally.

However, the problem with this solution is the fact that it is not flexible, i.e. it dictates the user where he has to play the purchased multimedia data stream due to the copyright protection. There is not a lot of imagination needed to predict that such system will only find little acceptance at the market especially when thinking about the fact that a number of players exist in a normal household. Such players can include for example a personal computer, a laptop, a hifi system, a car hifi system, a video recorder, a solid state player, etc.

SUMMARY OF THE INVENTION

Therefore, it is the object of the present invention to provide a flexible concept for selectively providing multimedia data that on the one hand finds acceptance at the market and at the other hand takes copyright aspects into consideration.

In accordance with a first aspect of the present invention, this object is achieved by a method for generating a second data stream from a first data stream which comprises a first header and a first payload data block with payload data, the method comprising the following steps: extracting the first header from the first data stream; generating a second header for the second data stream; entering at least a part of the first header into the second header, the part of the first header including information which allows conclusions as to the origin of the payload data; and generating a second payload data block having the same payload data as the payload data block of the first data stream, so as to obtain the second data stream.

In accordance with a second aspect of the present invention, this object is achieved by a method for playing a second data stream which comprises a second header and a second payload data block and has been generated due to a first data stream which comprises a first header and a first payload data block, wherein at least a part of the first header which comprises information regarding the origin of the first data stream, is contained in the second header, the method comprising the following steps: extracting the part of the first header from the second header; verifying the origin of the second data stream using the part of the first header which comprises information regarding the origin of the first data stream; and in case of a positive result of the verifying step, playing the second data stream.

In accordance with a third aspect of the present invention, this object is achieved by an apparatus for generating a second data stream from a first data stream which comprises a first header and a first payload data block with payload data, the apparatus comprising the following: means for extracting the first header from the first data stream; means for generating a second header for the second data stream; means for entering at least a part of the first header into the second header, the part of the first header including information which allow conclusions as to the origin of the payload data; and means for generating a second payload data block which comprises the same payload data as the payload data block of the first data stream, so as to obtain the second data stream.

In accordance with a fourth aspect of the present invention, this object is achieved by an apparatus for playing a second data stream which comprises a second header and a second payload data block and has been generated due to a first data stream which comprises a first header and a first payload data block, at least a part of the first header, which comprises information regarding the origin of the first data stream, being contained in the second header, the apparatus comprising the following: means for extracting the part of the first header from the second header; means for verifying the origin of the second data stream using the part of the first header which comprises information regarding the origin of the first data stream; and means for playing the second data stream, which responds to the means for verifying, so as to play the second data stream only if the means for verifying provide a positive result.

The present invention is based on the knowledge that music piracy can only be limited by using a device-specific identification of payload data streams. This means that a payload data piece that has been processed in the form of a payload data stream is not licensed person-specific but device-specific. In order for such a system to find acceptance at the market the situation has to be taken into account that a person usually has several players and that a person wants to have a free choice on which player she/he wants to play the purchased multimedia piece.

It is pointed out at this stage that payload data in general includes multimedia data that is audio data, video data or a combination of audio data and video data, but also text data. For practical reasons the subject matter of the present invention will be disclosed using multimedia data. It is however clear that all the payload data for which there is a demand to follow up their origin can be processed by the devices and methods according to the invention.

However, to prevent the way from being opened again for unlimited copying, a "copy" of the multimedia data stream has to be carried out device-specific for another device of a user as well. At the same time it is absolutely significant that the origin of each copy of a multimedia piece can be tracked down, i.e. it should always be possible to ascertain without doubt who has created a multimedia piece (author, composer), who has put it into circulation (provider, distributor, supplier), who has made an intermediate copy, and who has possibly made a further intermediate copy, etc. Only when the origin is known a user of a multimedia piece can prove without doubt that he uses the multimedia piece legally, or only then an illegal user can be found guilty without doubt.

Furthermore it is possible to carry out the binding of the multimedia data not to one player directly, but to bind the data to a "Smart Card". Thereby identical multimedia data streams can be maintained on various devices, but can only be used on the respective device where the Smart Card is inserted at that time.

Therefore, according to the present invention a second data stream is generated from a first data stream comprising a first payload data block with multimedia data, that also comprises a first header and a first payload data block with multimedia data, a second data stream is generated that also comprises again a header and a payload data block. However, in this second header, i.e. the header of the second data stream according to the present invention at least those parts of the first header, i.e. the header of the first data stream allowing conclusions as to the origin of the multimedia data are included. The second payload data block comprises the same multimedia data as the first payload data block, i.e. the payload data block of the first data stream.

The header of the second data stream can essentially have the same format as the header of the first data stream. However, it includes Besides the usual header information comprises additionally at least the information from the first header allowing conclusions as to the origin of the multimedia data.

Essentially, in a preferred embodiment of the present invention, the whole first header is entered into the second header. In order to protect the second header comprising the first header from manipulation it can additionally be provided with a digital signature that is derived from the data of the second (current) header and above that from the data of the first (old) header. In a preferred embodiment of the present invention, data from the first header allowing conclusions as to the origin of the multimedia data comprise a supplier identification, i.e. an identification of the supplier of the first data stream that could for example be the Deutsche Telekom (German telecommunications company), as well as author information allowing conclusions as to the author or composer, as well as a user identification, i.e. an identification of the device for which the data stream has originally been licensed.

It is a specific advantage of the inventive concept that it can be carried out as often as desired what leads to a multiply recursive header structure since a third data stream that comprises a third header and a third payload data block again comprises origin information of the second header in its header. This origin information is on the one hand the origin information of the first header and on the other hand the origin information of the second header. Analogous to the origin information of the first header the origin information of the second header is for example an identification of the device the piece was originally licensed for by the original supplier and an identification of the device a "copy" was made for, for example an identification of a car hifi system.

Here, it will be especially noted that the author information of the first header is also present in the header of the third data stream. Thus, the inventive concept is in conformity with statutory regulations regarding any program or any apparatus removing author information as illegal. Such statutory regulations have already become national law in the United States and it might only be a question of time when these regulations will be nationalized Europe wide.

In a preferred embodiment of the present invention the part of an old header taken over into the new header contains only licensing information referring to the manner how a licensed multimedia piece may be used, i.e. how often it may be played and how often it may be copied or whether a copy of a copy is legal or not.

The payload data block can of course be encrypted symmetrically, while the key of the symmetrical encrypting method is encrypted asymmetrically. In this case an apparatus for generating the second data stream will carry out a complete decryption from the first data stream and subsequently a complete new encryption.

Thus, the inventive concept allows full protection of a multimedia piece in a way from the author or composer via an arbitrary number of copies to an end user. Above that, the origin of a current copy can be tracked down unbrokenly at any time of a copy or distribution chain whereby the number of copies or distribution processes is arbitrary. Additionally, author information is considered any time whereby copyright protection is satisfied. Finally, the inventive concept can be implemented efficiently and flexible such that it is also suitable for inexpensive players with limited memory and processor resources, that it is easy to handle, and that modern client demands for high flexibility are fully considered.

DETAILED DESCRIPTION OF PREFERRED EMBODIMENTS

Figure 1:
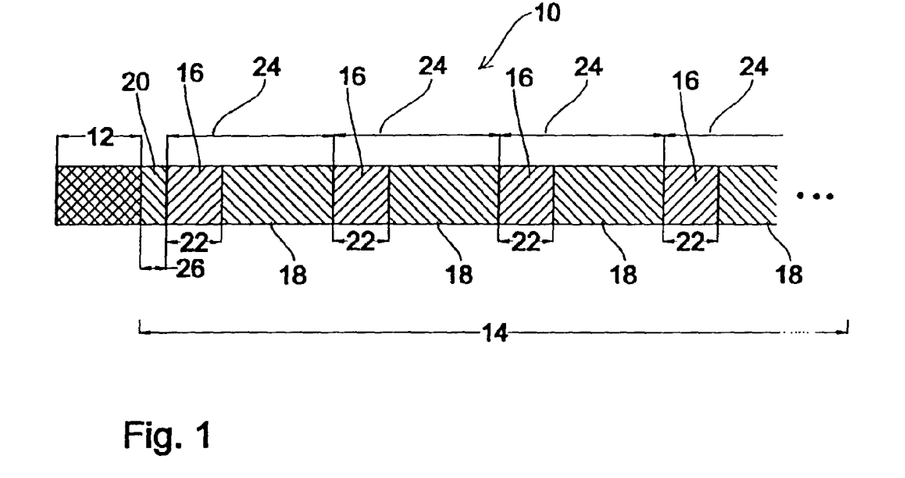
FIG. 1 shows a multimedia data stream, which can be produced according to the present invention.

FIG. 1 shows an encrypted multimedia data stream 10 comprising a header 12 and a payload data block 14 that is a block containing encrypted multimedia data. The payload data block 14 includes encrypted sections 16 and unencrypted sections 18 between the encrypted sections 16. In addition a multimedia data stream, which can be produced according to the present invention, includes a further unencrypted section 20 following the header 12 and being arranged in front of an encrypted section 16.

Usually the multimedia data to be encrypted is encoded in any way, such as according to a MPEG standard, such as MPEG-2 AAC, MPEG-4 audio or MPEG Layer-3. It is thus sufficient to encrypt certain sections of the multimedia data to be encrypted. This leads to an essentially decreased processing expenditure both at the provider who encrypts the data and at the customer who in turn has to decrypt the data. Furthermore, the pleasure of hearing and seeing respectively of a user who only uses the unencrypted multimedia data is seriously impaired by the constantly occurring encrypted blocks, when the multimedia data is only encrypted partly.

Although FIG. 1 shows an encrypted multimedia data stream in which the header 12 is arranged at the beginning of the encrypted multimedia data stream this arrangement of the header and the payload data block is not to refer to the transmission of the encrypted multimedia data stream. The term "header" is only meant to express that a decryption device which is to decrypt the encrypted multimedia data stream at first requires at least parts of the header before the multimedia data itself can be decrypted. Depending on the transmission medium the header may also be arranged at some place in the payload data block or be received after certain parts of the payload data block when for example a packet-oriented transmission of the multimedia data stream is thought of, in which different packets, one of which may contain the header and another one a part of the payload data block, are transmitted via different physical transmission ways in such a way that the order of receipt does not have to correspond to the order of sending. However, in this case a decryption device has to be able to save the packets received and to order them again in such a way that information is extracted from the header to begin the decryption. The encrypted multimedia data stream may further be present in the form of a file or also in the form of an actual data stream, when for example a life transmission of a multimedia event is thought of. This application will especially occur with digital user-selective broadcasting.

The length of an encrypted section 16 is represented by a value amount 22 while the spacing in the encrypted multimedia data stream from the beginning of an encrypted section 16 to the beginning of the next encrypted section 16 is referred to as step 24. The length of the further encrypted section 20 is given by a value first step 26.

These values 22, 24 and 26 are obviously required for a correct decrypting of the multimedia data in a decryption device. This is why they have to be entered into the header 12 as will be explained later.

Figure 2:
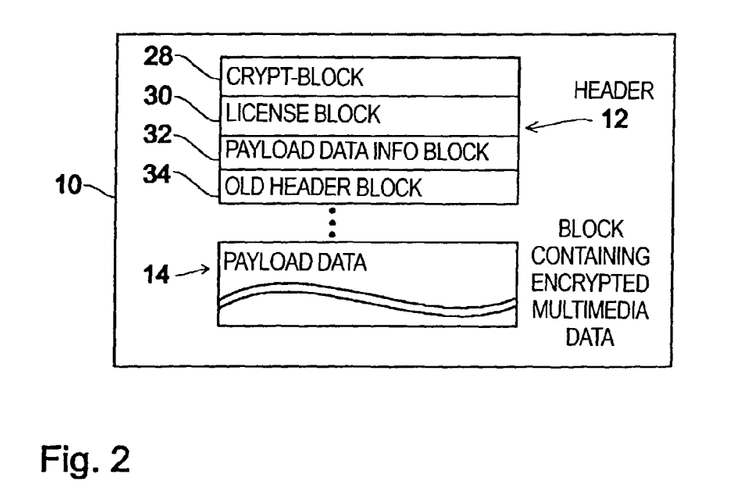
FIG. 2 shows a detailed illustration of the header and the payload data block of the encrypted multimedia data stream.

FIG. 2 shows a more detailed illustration of the encrypted multimedia data stream 10 consisting of the header 12 and the payload data block 14. The header 12 is divided into several sub blocks that will be explained especially referring to FIG. 3. It is pointed out that the number and the function of the sub blocks can be extended at will. Thus, in FIG. 2 some sub blocks of the header 12 are illustrated in an only exemplary way. The header includes as it is shown in FIG. 2 a so-called crypt-block 28 comprising, in general terms, relevant information for encrypting the multimedia data. In addition the header 12 includes a so-called license block 30 comprising data referring to how a user can or is allowed to use the encrypted multimedia data stream. The header 12 further includes a payload data info block 32 which can include information concerning the payload data block 14 and as well as general information about the header 12 itself. Furthermore the header 12 may comprise an old header block 34 enabling a so-called recursive header structure. This block makes it possible for the user who, apart from a decryption device is also in the possession of an encryption device to reformat an encrypted multimedia data stream for other replay instruments in his possession without losing or modifying the original header information provided by the distributor. Depending on the application further sub blocks, such as an IP information block (IP=intellectual property) according to ISO/IEC 14496-1, MPEG-4, Systems, 1998, containing copyright information, can be added to the header 12.

As it is the standard in the art, an internal block structure can be allocated to each block, this structure at first requesting a block identificator and including the length of the sub block and at last giving the block payload data itself. Thus, the encrypted multimedia data stream, and in particular the header of the encrypted multimedia data stream, is given an increased flexibility in such a way that it can react to new requirements in such a way that additional sub blocks may be added or existing sub blocks may be omitted.

Figure 3:
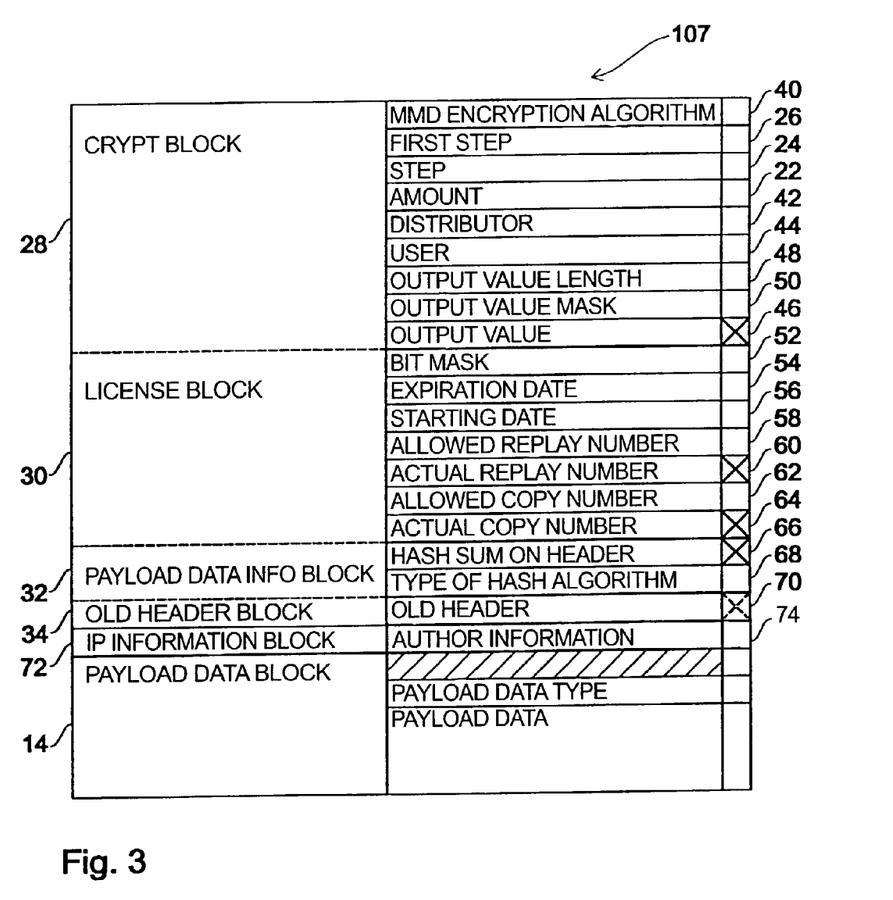
FIG. 3 shows a selection of certain entries into the individual sub blocks of the header block.

FIG. 3 gives an overview of the block payload data of the individual sub blocks shown in FIG. 2.

At the beginning the crypt block 28 is explained. It contains an entry for a multimedia data encryption algorithm 40 identifying the symmetrical encryption algorithm used in the preferred embodiment, which has been used when encrypting the multimedia data. The entry 40 can be an index for a table in such a way that, after reading the entry 40, a decryption device is capable of selecting this encryption algorithm the encryption device has used from a plurality of encryption algorithms. The crypt block 28 further includes the entry first step 26, the entry step 24 and the entry amount 22, which has already been illustrated in connection with FIG. 1. These entries in the header enable a decryption device to subdivide an encrypted multimedia data stream accordingly to be able to carry out a correct decryption.

The crypt block 28 further contains an entry for the distributor or provider or supplier 42, the entry being a code for the distributor who has produced the encrypted multimedia data stream. An entry user 44 identifies the user who has obtained the encrypted multimedia data stream in some way from the distributor who is identified by the entry 42. According to the invention it is preferred not to use a person-related user identification since this would open the way for illegal copies. Instead it is preferred to carry out the user identification device specific. The entry user would then for example comprise the serial number of a PC, a laptop, a car hifi system, a home stereo system, smart card etc. that authorizes playing only on a certain device. For further increase of flexibility and/or safety a certain identification like for example a logic link of the hard disk size with the processor number etc. for the example of a PC can be applied instead of a serial number that looks different for every producer but might by chance be identical.

An entry 46 contains an output value that will be discussed in detail later. This output value in general represents an encrypted version of the multimedia data key which, in connection with the multimedia data encryption algorithm identified by the entry 40, is required to decrypt the encrypted multimedia data (sections 16 in FIG. 1) present in the payload data block 14 correctly. In order to achieve a sufficient flexibility for future applications, the two entries output value length 48 and output value mask 50 are further provided. The entry output value length 48 illustrates the actual length of the output value 46. To achieve a flexible header format more bytes are however provided in the header format, for the output value than an output value actually comprises. The output value mask 50 thus illustrates how a shorter output value is distributed in a way on a longer output value place. If the output value length is for example half as big as the space available for the output value, the output value mask could be formed in such a way that the first half of the output value mask is set while the second half is masked. In this case the output value would simply be entered into the space provided for the header by the syntax and occupy the first half while the other half would be ignored due to the output value mask 50.

Now the license block 30 of the header 12 FIG. 2 will be explained. The license block includes an bit mask 52. This entry can comprise certain specific information for replaying or for the general way of using the encrypted multimedia data. With this entry a decryption device could especially be told whether the payload data can be replayed locally or not. In addition at this point it may be signalled whether the challenge response method has been used for the encryption, this method being described in the already mentioned German patent DE 196 25 635 C1 and enabling an efficient data base access.

An entry expiration date 54 indicates the point in time at which the permission to decrypt the encrypted multimedia data stream expires. A decryption device will in this case check the entry expiration date 54 and compare it to a build-in time measuring device in order not to carry out a decryption of the encrypted multimedia data stream if the expiration date has been exceeded. This makes it possible for the provider to make encrypted multimedia data available for a limited amount of time, which has the advantage of a much more flexible handling and price setting. This flexibility is further supported by an entry starting date 56 in which it is specified from which point on an encrypted multimedia file is allowed to be decrypted. An encryption device will compare the entry starting date with its built-in watch to only carry out a decryption of the encrypted multimedia data when the current point in time is later than the starting date 56.

The entry allowed replay number 58 indicates how often the encrypted multimedia data stream can be decrypted, that is replayed. This further increases the flexibility of the provider in such a way that it for example only allows a certain number of replays compared to a certain sum which is smaller than a sum which would arise for the unlimited usage of the encrypted multimedia data stream.

For verifying and supporting respectively the entry allowed replay number 58 the license block 30 further includes an entry actual replay number 60 which could be incremented by one for example after each decryption of the encrypted multimedia data stream. A decryption device will thus always check whether the entry actual replay number is smaller than the entry allowed replay number 58. If this is the case, a decryption of the multimedia data is carried out. If this is not the case, a decryption is no longer carried out.

Analog to the entries 58 and 60 entries allowed copy numbers 62 and actual copy number 64 are implemented. By means of the two entries 62 and 64 it is made sure that a user of the multimedia data only copies them as often as he or she is allowed to do so by the provider or as often as he or she has paid for when purchasing the multimedia data. By the entries 58 to 64 a more effective copyright protection is assured, a selection between private users and industrial users being attainable for example by setting the entries allowed replay number 58 and allowed copy numbers 62 to a smaller value.

The licensing could for example be designed in such a way that a certain number of copies (entry 62) of the original are allowed while copies of a copy are not allowed. The header of a copy would then, unlike the header of the original, have zero as the entry allowed copy number in such a way that a proper encryption/decryption device can no longer copy this copy.

In the example for a multimedia data protection protocol (MMP) shown here the header 12 further contains a payload data information block 32 having in this case only two block payload data entries 66 and 68, the entry 66 containing a hash sum on the total header, while the entry 68 identifies the type of hash algorithm having been used for forming the hash sum on the total header.

Hash algorithms are known in the art and can be used to form a digital signature of a data amount such that also a small change of data in a data amount leads to a change of the digital signature whereby the authenticity of data and especially of the (non encrypted) header can be checked in an easy and efficient way.

A preferred method for generating a digital signature is to form a hash sum on the whole header and to encrypt or decrypt it asymmetrically in order to obtain the entry 66. Specifically, the supplier would decrypt the hash sum of the whole header with his private key. However, the encryption apparatus at the customer would form the hash sum on the whole (eventually illegally modified) header itself and above that decrypt the entry 66 with the public key of the asymmetrical encryption method and then compare the two results. If they match, the playing process will be started. If they don't match, no decrypting/decoding/playing is possible.

In this context reference is made for example to "Applied Cryptography", Second Edition, John Wiley & Sons, Inc. by Bruce Schneider (ISBN 0 417-11709-9) including a detailed illustration of symmetrical encryption algorithms, asymmetrical encryption algorithms and hash algorithms.

The header 12 finally includes the old header block 34, which, along with the synchronizing information, which is not shown in FIG. 3, comprises the entry old header 70. In the entry old header 70 the old header can be maintained by the provider if a user performs an encryption himself and thus produces a new header 12, in order not to lose essential information the provider has entered into the header.

For this purpose other information 74 (IP information block 72) could for example count prior user information and distributor information which enables tracing back of a multimedia file which for example has been decrypted and encrypted several times by different instruments to the original provider transparently, the other information 74 being maintained. It is thus possible to check at any point whether an encrypted multimedia file has been acquired legally or illegally.

Figure 4:
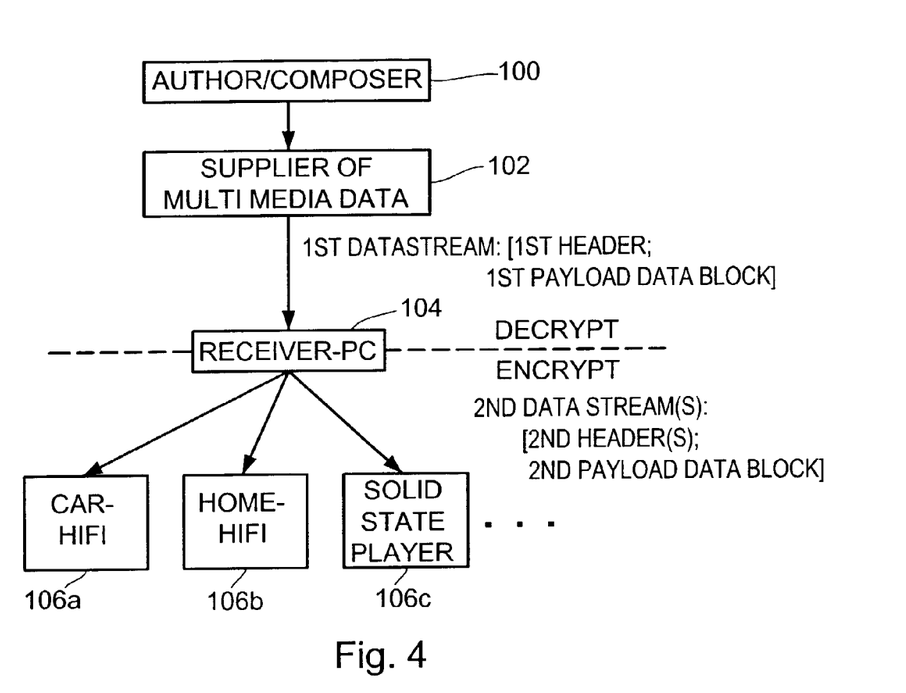
FIG. 4 a schematic illustration of a distribution scenario.

FIG. 4 shows a schematic block diagram of a scenario wherein the inventive concept can be applied in an advantageous way. An author or composer 100 has created a multimedia piece, for example a text, a piece of music, a film or a picture. He delivers this work, in this invention generally referred to as multimedia piece, to a supplier 102 of multimedia data. It is especially pointed out here that the expression "multimedia data" in the sense of the present invention comprises audio data, video data or a combination of audio and video data.

The supplier ensures that the multimedia piece of the author/composer 100 is put in circulation by encoding it for example according to the method MPEG layer 3 (MP3). In order to achieve a customer selective providing for use of the encoded multimedia piece the supplier 102 will bring the encoded multimedia piece into a first data stream comprising a header and payload data block. A data stream as it might be used is illustrated in FIG. 3.

In this connection it should be especially pointed to the IP information block 72 comprising author information 74 as payload data identifying the author/composer or in general artist. The IP information block could for example be carried out according to ISO/IEC 14496-1 MPEG-4 systems, 1998. It could especially comprise the name of the author/composer/artist or also the ISBN number (ISBN=international standard book number), the ISRC code (ISRC=international standard recording code), the ISAN number (ISAN=international standard audiovisual number), the ISMN number (ISMN=international standard music number), etc. Such meta information will allow a unique identification of the author of the multimedia piece such that by adding these meta information to the payload data the enforcement of copyrights will be much easier.

The supplier of multimedia data 102 generates a first data stream comprising a first header and a first payload data block. All the data illustrated in FIG. 3 can be included in the header, wherein the author information (entry 74), the distributor identification (entry 42) and the user identification (entry 44) should be especially noted. While the author information (entry 74) represents the origin of the multimedia piece in general, the distributor identification (42) uniquely defines the origin of the first data stream while the user identification defines the "destination" of the first data stream, i.e. the device that is allowed to use the data stream and that has also paid for it, whereby on the one hand the service of the supplier 102 of multimedia data is paid and on the other hand royalties to the author/composer 100 can flow. In the first header of the first data stream a receiver-PC 104 could for example be identified by the user identification 44. The first data stream can now on the one hand be played on the receiver-PC 104, however, according to the invention, the receiver-PC is defined in such a way that it can also generate a "copy" of the first data steam in order to generate one or several second data streams comprising in their header the user identification 44 of a car hifi system 106*a*, a home hifi system 106*b*, a solid state player 106*c*, etc.

Every second header will essentially comprise the same payload data block, the header of every second data stream, i.e. the second header, will however be different regarding the user identification 44. However, according to the invention, every second header will comprise information allowing conclusions as to the origin of the respective second data stream. This information can comprise author information, an identification for the receiver-PC 104 and an identification for the supplier 102 of the first data stream. Preferably, the second header additionally comprises licence information referring to the fact how often the multimedia piece may be played or how often it may be copied. It can especially happen that for example five copies are allowed but no copy of the copy is allowed. In the entry allowed copy number 62 of the first header there would for example be five. In the entry allowed copy number of the second header however, there would be zero. Even when the car hifi system 106*a*, the home hifi system 106*b* or the solid state player 106*c* were designed in such a way that it can carry out a decryption or an encryption by itself, i.e. like the receiver-PC 104, still no further copy would be produced, i.e. no third data stream, since the entry 62 in the second header of the second data stream is set to zero. If this were not the case and if the copy of a copy were allowed the devices 106*a* to 106*c* could again create third data streams but would comprise origin information of the respective second data stream and naturally of the respective first data stream.

Figure 5:
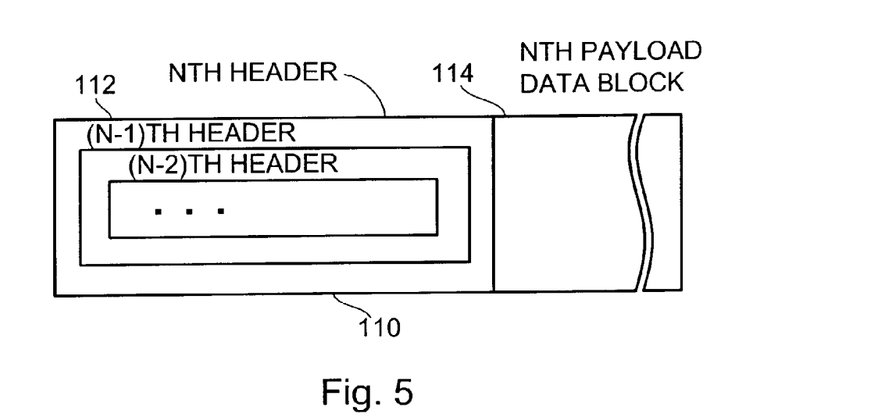
FIG. 5 a schematic view of a data stream with recursive header structure.

This results in a recursive header structure shown schematically in FIG. 5 that can principally be repeated arbitrarily. FIG. 5 shows an nth data stream 110 comprising an nth header 112 and an nth payload data block 114. The nth header 112 again comprises a (n−1)th header that again comprises a (n−2)th header, etc.

Preferably, the supplier of multimedia data 102 (FIG. 4) encrypts the multimedia data in the first payload data block at least in parts. Preferably, a symmetrical encrypting method for encrypting the multimedia data is used, wherein the key of the symmetrical encrypting method is again encrypted asymmetrically. The asymmetric key encrypted with the private key of the supplier 102 for the symmetrical encrypting method is the output value 46 (FIG. 3). The receiver-PC 104 will therefore need the respective public key of the supplier 102 of multimedia data in order to decrypt the output value 46 again, in order to obtain the key for the symmetrical decrypting method that the supplier 102 of multimedia data has used as well. The receiver-PC 104 is now enabled to play the first data stream. If the first data stream is encoded the receiver-PC 104 carries out a decoding prior to playing. The sequence will therefore be: decrypting, decoding, and playing.

However, the receiver-PC should also be able to generate a second data stream for a specific additional player 106*a* to 106*c*. In this case the receiver-PC 104 can be configured for encrypting the multimedia data that are decrypted, wherein a symmetrical encrypting method is preferred due to speed aspects. The receiver-PC 104 will again asymmetrically encrypt the key for the symmetrical encrypting method with its private key, provide the second header with its own identification as distributor entry 42 and further provide the second header with the identification for example of the car hifi system as user identification 44. Further, the receiver-PC 104, will generate a different output value that will be entered into the entry 46 of the second header since the receiver-PC has a different data key than the supplier 102 of multimedia data. Above that, the receiver-PC will update the licence-block of the second header as desired. However, according to the invention, it will preferably write the whole first header into the entry old header 70 in such a way that all information of the first header are maintained and especially the origin information of the first data stream as it has been described several times.

Neither the first, second or the nth header are encrypted themselves. In order to protect the respective headers from attacks after the completion e.g. of the second header a hash sum is formed on the header for example according to a hash algorithm identified in entry 68 (FIG. 3). Preferably, this hash sum is not only formed by the blocks 28, 30, 32, 72 of the second header but it also comprises the block for the old header 34. This hash sum can then be directly entered into the entry 66 (FIG. 3). For the increase of safety it is however preferred to enter a digital signature for the hash sum of the second header. A digital signature of the hash sum on the second header could for example be again formed with an asymmetrical encryption method in such a way that the receiver-PC 104 generating the second data stream encrypts the hash sum on the second header with its own private key and writes the result into the entry 66.

The home hifi system 106b will now at first verify the second data stream by also forming a hash sum on the second header as it is supplied to the home hifi system. Further, the home hifi system 106b will decrypt the entry 66 in the second header with the public key of the receiver-PC 104 and compare the obtained result with the just calculated hash sum. If both hash sums are the same it can be assumed that the second data stream has not been manipulated. If the two results differ, a legally implemented car hifi system will not continue playing since it can be assumed that unallowed manipulations have been carried out either at the second header or in a way "belated" at the first header.

Figure 6:
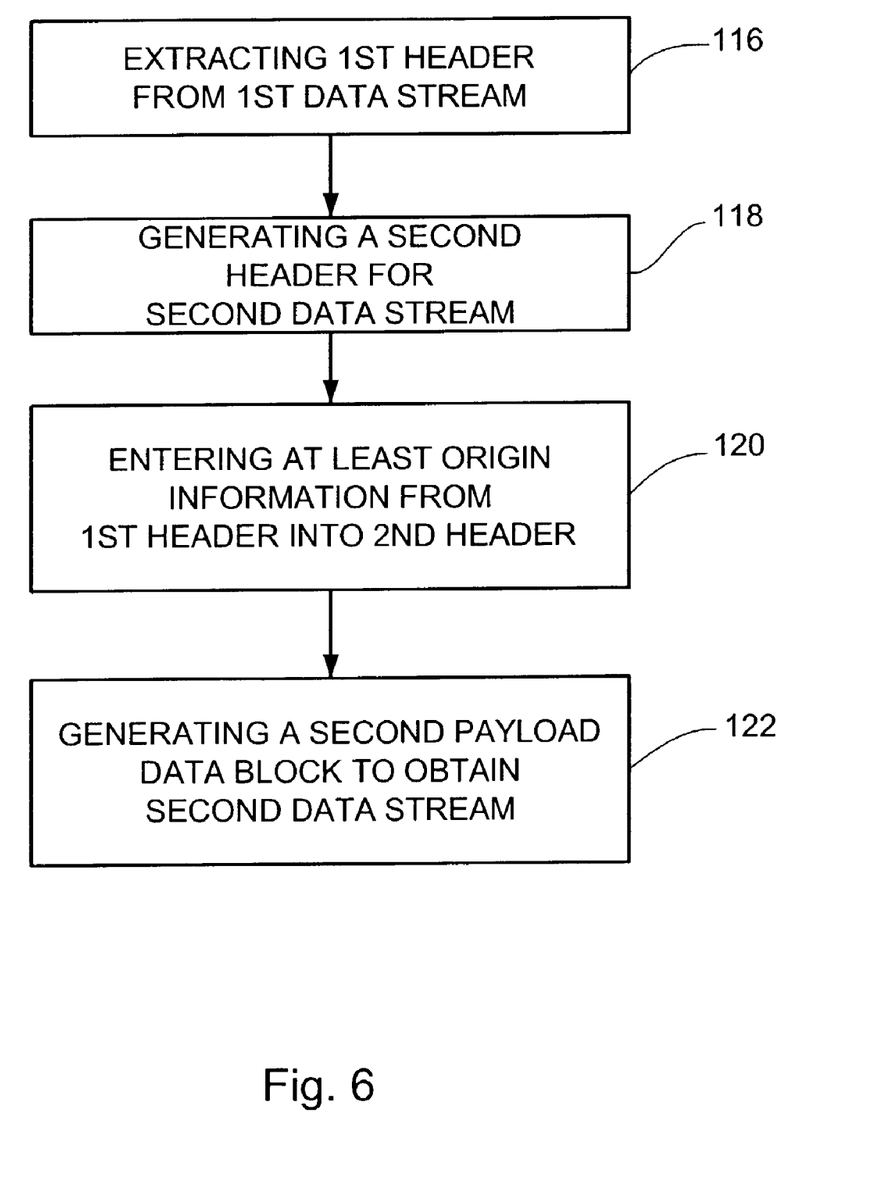
FIG. 6 a flow chart of a method for generating a second data stream from a first data stream according to the present invention.

FIG. 6 shows a flow chart for the inventive method for generating a second data stream from a first data stream that is carried out by the receiver-PC 104 in order to "retag" the device specifically licensed first data stream to other devices (106a to 106c).

Basically, the receiver-PC 104 will at first extract the header from the first data stream (116). Above that, the receiver-PC 104 will generate a second header for the second data stream (118) as far as possible. This header generated as far as possible could comprise all information of the header shown in FIG. 3 (blocks 28, 30, 32, 34, 72), but not the old header block 34. This block will be described in a step 120, wherein at least the origin information from the first header is entered into the entry 70. However, for safety reasons and also for implementation reasons it is preferred to enter not only the origin information from the first header but also all information from the first header into the entry 70 of the second header. This could lead to the fact that certain information exist twice, like e.g. the author information 74 as well as information from other blocks, for example first step 26, step 24, amount 22, etc. Already here it can be seen that by the fact that the receiver-PC 104 generates a complete second header in step 118 it is not bound to the parameters of the supplier 102 of multimedia data. For example, a less expensive encrypting method could be applied in order to enable the second data stream to be encrypted with less effort again for example by the solid state player 106c that needs, as known, limited memory and processor resources in order to be offered inexpensively. Considering these aspects the payload data block of the second data stream might even not be encrypted anymore at all, if preferred.

Finally, the receiver-PC 104 generates a second payload data block for the second data stream (122) in order to finally obtain the second data stream.

Figure 7:
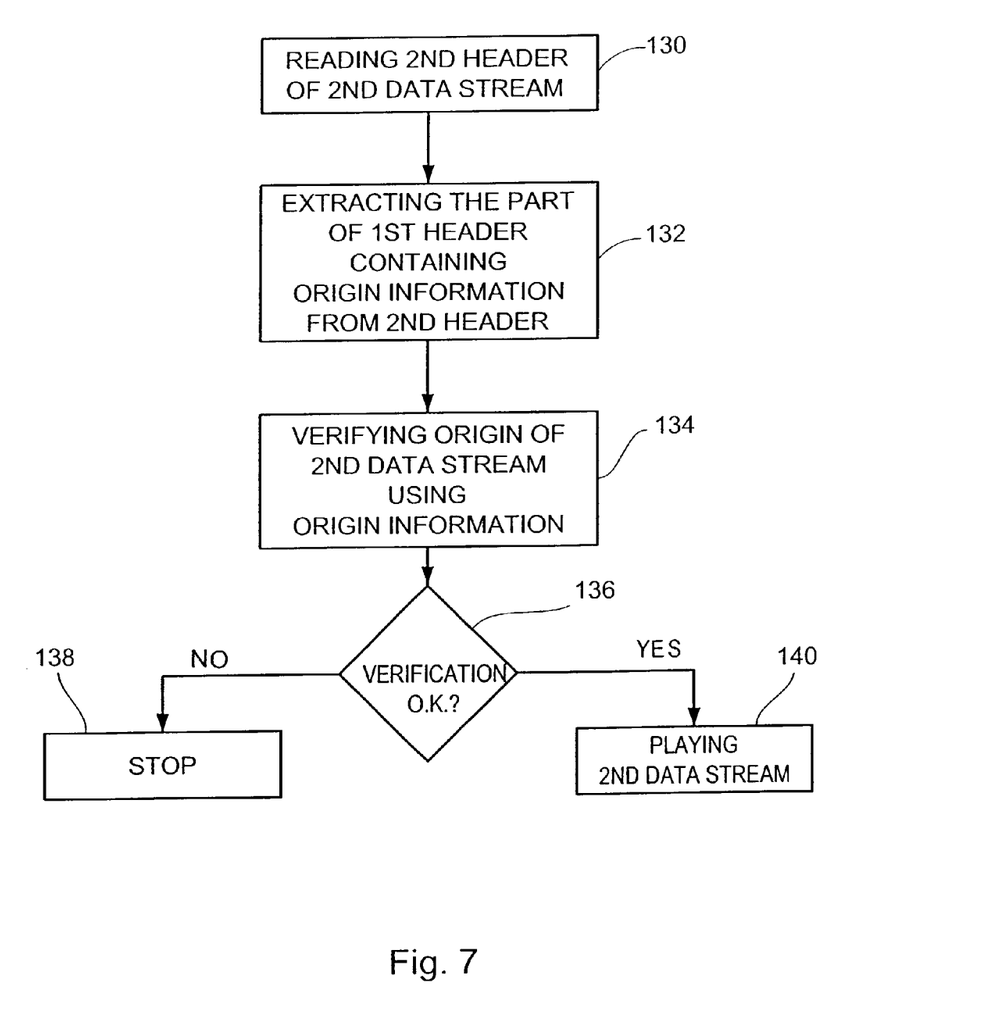
FIG. 7 a method for playing a second data stream generated based on a first data stream according to the present invention.

The flow chart in FIG. 7 describes in general a method for playing a second data stream generated based on a first data stream, wherein this method could be carried out in one of the devices 106a to 106c. If between the supplier 102 of multimedia data and the receiver-PC 104 a further intermediate distributor as for example a "retailer" of multimedia data is disposed whom the supplier 102 of multimedia data who will then have a wholesaler function supplies, the inventive method generally illustrated in FIG. 7 would already be carried out by the receiver-PC 104.

Generally, the method for playing can be started with the step of reading the second header of the second data stream (130). The device 106a will then for example extract the part of the first header comprising origin information, i.e. the old header block 34 and read the payload data of the entry 70 (132).

In order to prevent the playing of illegal pieces the origin of the second data stream is verified in step 134 using the origin information in entry 70. Such a verification could for example consist of checking whether origin information is present in the second header at all (136). If it is found out in the verification 136 that no origin information is present in the second header at all, a legally driven playing apparatus according to the present invention will refuse playing and will stop the operation (138). If it is found out in this simple form of verification 136 that origin information is present and that it makes sense and is no "deception data" of some sort, the inventive playing apparatus will begin or continue playing the second data stream (140).

A more expensive way of verification could be to test whether the supplier identification 42 of the second header matches the user identification 44 of the first header. In this case it would be proved without doubt that the copy present in the player comes from the respective home-PC. Any further verification techniques with more or less effort are considered.

In a preferred embodiment of the present invention it is preferred to carry out the verification via a digital signature comprising both data of the first header and data of the second header, as it has been described in connection with FIG. 4. Further even more complicated methods can also be used for verification wherein however always the origin of the present data stream is tested that can either be author information or other respective supplier entries 42 or user entries 44 of the individually embedded header of the generally spoken multiply recursive header structure that is illustrated in FIG. 5.

Besides the verification of the origin of the second data stream (step 134 in FIG. 7) the player will preferable be implemented in such a way that it processes also the licence block 30 and especially for example according to the entries 58 and 60 processes regarding to the authorized or actual playing number in order to find out whether it may play a data stream. The player will of course use the other information of the second header in the described manner if the second data stream is encrypted in order to finally decrypt, decode and play the second data stream.

The invention claimed is:

1. Method for generating a second data stream from a first data stream which comprises a first header and a first payload data block with payload data, wherein the first header comprises a first supplier identification for a supplier of the first data stream and a first user identification for a receiver of the first data stream, the method comprising the following computer implemented steps:

extracting the first header from the first data stream;

generating a second header for the second data stream, wherein the second header comprises a second supplier identification for a supplier of the second data stream and a second user identification for a receiver of the second data stream;

entering at least a part of the first header into the second header, the part of the first header including information which allows conclusions as to the origin of the payload data, wherein the information comprises the first supplier identification for the supplier of the first data stream, and the first user identification for the receiver of the first data stream; and     generating a second payload data block having the same payload data as the payload data block of the first data stream, so as to obtain the second data stream;

wherein the payload data include audio data, video data, a combination of audio data and video data, or text data.

2. Method as claimed in claim 1, wherein the information allowing conclusions as to the origin of the first data stream further includes author information, such as information on an author or a composer, an ISRC number, an ISAN number or an ISMN number of the payload data of the first data stream.

3. Method as claimed in claim 1, wherein the first user identification is device-specific, the method further comprising the step of receiving the first data stream by a player or by a smart card indicated by the first user identification.

4. Method as claimed in claim 1, wherein the part of the first header which is entered into the second header further comprises licence data relating to the manner in which a receiver of the first data stream may use the same, the licence data of the first header specifying the licence data of the second header.

5. Method as claimed in claim 4, wherein the licence data of the first header specify that the first data stream may be copied a certain number of times, that no copy may be taken of a copy, and wherein the step of generating the second header for the second data stream includes the step of entering second licence information into the second header of the second data stream, such that no more copies are allowed to be taken of the second data stream.

6. Method as claimed in claim 1, which further comprises the following step:

issuing a digital signature for the second header, including the part of the first header, and attaching the digital signature to the second header.

7. Method as claimed in claim 6, wherein the issuing step further comprises the following substeps:

forming a hash sum over the second header, including the part of the first header, using a specified hash algorithm; and     encrypting the hash sum by means of an asymmetric encrypting method using a private key of the receiver of the first data stream.

8. Method as claimed in claim 1, wherein the payload data in the payload data block are at least partly encrypted and wherein encrypting information is contained in the first header, the step of generating the second header further comprising the following steps:

decrypting the first payload data block of the first data stream using the encrypting information in the first header,     encrypting the decrypted payload data and entering corresponding encrypting information into the second header,     the encrypting information of the first header also being entered into the second header.

9. Method as claimed in claim 8, wherein the encrypted payload data in the first payload data block are encrypted symmetrically using a key and wherein the key is again encrypted asymmetrically using a private key, the decrypting step comprising the following steps:

decrypting the encrypted key by means of the public key of the supplier so as to obtain the key for asymmetric decryption;

encrypting a payload data key of the decrypted payload data using a private key of a receiver of the first data stream carrying out the method for generating a second data stream; and     entering the asymmetrically encrypted payload data key into the second header.

10. Method as claimed in claim 1, wherein in the step of entering, the entire first header is entered into the second header.

11. Method as claimed in claim 1, wherein the first header itself comprises at least a part of a header of a data stream which relates to the origin of the first data stream, such that the entering step results in a multiple recursive header structure.

12. Method for playing a second data stream which comprises a second header and a second payload data block and has been generated due to a first data stream which comprises a first header and a first payload data block, wherein at least a part of the first header which comprises information regarding the origin of the first data stream, wherein the information comprises a first supplier identification for a supplier of the first data stream, and the first user identification for a receiver of the first data stream, is contained in the second header, wherein the second header comprises a second supplier identification for a supplier of the second data stream and a second user identification for a receiver of the second data stream, the method comprising the following computer implemented steps:

extracting the part of the first header from the second header;

verifying the origin of the second data stream using the part of the first header which comprises information regarding the origin of the first data stream, wherein a positive result is obtained if the second supplier identification matches the first user identification, and wherein a negative result is obtained if the second supplier identification does not match the first user identification;

in case of a positive result of the verifying step, playing the second data stream; and     in case of a negative result of the verifying step, refusing to play the second data stream.

13. Method as claimed in claim 12, wherein the second header of the second data stream has a digital signature attached to it which fits the part of the first header, and wherein the verifying step comprises the following substep:

checking the authenticity of the second header using the digital signature.

14. Method as claimed in claim 13, wherein the digital signature is the result of an encryption of a hash sum of the second header, which encryption has been carried out by means of a private key of the apparatus having generated the second data stream, the step of checking the authenticity comprising the following steps:

decrypting the digital signature by a public key of the apparatus which has generated the second data stream, so as to obtain the hash sum of the second header;

forming a hash sum of the present header;

comparing the hash sums;

in case of the hash sums matching, issuing a positive verification result.

15. Method as claimed in claim 14, wherein the part of the first header further comprises licence information regarding the manner in which the first data stream may be utilized, and wherein the second header comprises licence data derived from the licence data of the first header, the method further comprising the following substeps:

comparing the licence data of the second header and the first header so as to evaluate the authenticity of the licence data of the second header;

in case of questionable authenticity, blocking the playing of the second data stream.

16. Apparatus for generating a second data stream from a first data stream which comprises a first header and a first payload data block with payload data, wherein the first header comprises a first supplier identification for a supplier of the first data stream and a first user identification for a receiver of the first data stream, the apparatus comprising the following:

an extractor for extracting the first header from the first data stream;

a second header generator for generating a second header for the second data stream, wherein the second header comprises a second supplier identification for a supplier of the second data stream and a second user identification for a receiver of the second data stream;

a processor for entering at least a part of the first header into the second header, the part of the first header including information which allow conclusions as to the origin of the payload data, wherein the information comprises a first supplier identification for a supplier of the first data stream, and the first user identification for a receiver of the first data stream; and a second payload data block generator for generating a second payload data block which comprises the same payload data as the payload data block of the first data stream, so as to obtain the second data stream.

17. Apparatus as claimed in claim 16, which is designed as a personal computer.

18. Apparatus for playing a second data stream which comprises a second header and a second payload data block and has been generated due to a first data stream which comprises a first header and a first payload data block, at least a part of the first header, which comprises information regarding the origin of the first data stream, wherein the information comprises a first supplier identification for a supplier of the first data stream, and the first user identification for a receiver of the first data stream being contained in the second header, wherein the second header comprises a second supplier identification for a supplier of the second data stream and a second user identification for a receiver of the second data stream, the apparatus comprising the following:

an extractor for extracting the part of the first header from the second header;

a verifier for verifying the origin of the second data stream using the part of the first header which comprises information regarding the origin of the first data stream; and a player for playing the second data stream, which responds to the means for verifying, so as to play the second data stream only if the means for verifying provide a positive result, and to refuse playing the second data stream in the case of a negative result.

19. Apparatus as claimed in claim 18, which is designed as a hifi system, as a car hifi system, as a portable multimedia player, as a computer or as a component of any of the above-mentioned devices.

* * * * *